United States Patent [19]

Nelson, Jr. et al.

[11] Patent Number: 4,791,270
[45] Date of Patent: Dec. 13, 1988

[54] GAS TUNGSTEN ARC WELDING MACHINE WITH INFINITE ROTATING WELDING HEAD AND TORCH TILT

[75] Inventors: Walter A. Nelson, Jr., Tinley Park; Gerald A. Kraatz, Naperville, both of Ill.

[73] Assignee: Ferranti Sciaky, Inc., Chicago, Ill.

[21] Appl. No.: 40,254

[22] Filed: Apr. 20, 1987

[51] Int. Cl.⁴ ............................................. B23K 9/12
[52] U.S. Cl. ................................. 219/125.1; 901/42
[58] Field of Search ............... 219/60 A, 125.1, 137.8; 901/42

[56] References Cited

U.S. PATENT DOCUMENTS

| | | | |
|---|---|---|---|
| 4,008,384 | 2/1977 | Cecil | 219/125.1 |
| 4,142,084 | 2/1979 | Torrani | 219/60 A |
| 4,249,062 | 2/1981 | Hozumi et al. | 219/137.8 |
| 4,418,266 | 11/1983 | Rosenbeck et al. | 219/125.1 |
| 4,538,046 | 8/1985 | Kazlauskas | 219/125.1 |
| 4,664,587 | 5/1987 | Case, Jr. et al. | 219/125.1 |

Primary Examiner—Clifford C. Shaw
Attorney, Agent, or Firm—Julius L. Solomon

[57] ABSTRACT

This invention relates to a machine for practicing the gas tungsten arc welding process which includes means for rotating the welding torch continuously while welding. Means are provided for feeding the shielding gases, feed wire and electric current to the rotating torch while welding. Means are also provided for tilting the torch about the point of welding. This invention makes it possible to weld continuously along a spiral path about a cylindrical object or on a flat or irregular surface.

9 Claims, 7 Drawing Sheets

GAS TUNGSTEN ARC WELDING MACHINE WITH INFINITE ROTATING WELDING HEAD AND TORCH TILT

This invention relates to automatic machines for practicing the gas tungsten arc welding process. The gas tungsten arc welding process (GTAW) is one in which heat is generated between a non-melting (tungsten) electrode and the workpiece by means of an electric arc passing between the metal electrode and the workpiece to be welded, with the electric arc burning in inert gas—for example, argon or helium, or a mixture of both. A tungsten electrode is used for one pole of the welding arc, which is shielded with the inert gas. The arc fuses the metal being weled as well as any filler material which may be added separately to the weld pool. The equipment required includes a welding torch, a welding power supply which may furnish either direct current, or alternating current, depending upon the type of metal to be welded, and a source of inert gas under the control of suitable pressure regulators and flow meters. The electric power requirements will depend upon the thicknesses to be welded and will range from 8 KW for a 200-ampere D.C. unit to 30 KW for a 500-ampere A.C. unit. For automatic welding systems, a means for measuring the voltage across the arc and maintaining the arc voltage is required. A wire feed mechanism is also included to automatically add filler wire to the weld zone. The GRAW process is used extensively for the welding of cylindrical objects such as pressure vessels and boilers and for the welding of pipes. Many of these welding operations require the continuous welding around the periphery of the cylindrical object and heretofore this has been accomplished by manual welding or, in the event an automatic machine is required, through the use of a machine which includes a movable welding torch which moves about the periphery of the cylinder. Because of the necessity to provide electric power and hoses to carry the gases and cooling water for the torch from a stationary position to the moving torch, the automatic welding machines available in the past could rotate the torch about the piece part only slightly more than 360 degrees, inasmuch as the hoses and electrical conductors to the torch would be wound around the stationary members of the machine and had to be unwound after a rotation of approximately 360 degrees. The present invention overcomes this limitation and allows for the continuous rotation of the welding gun while it is being supplied with gas and cooling water and electrical current while it welds a continuous bead about the periphery of a cylindrical object. The present invention also opens up new avenues for welding. For example, with a machine built in accordance with the present invention, it would be possible to weld along a spiral path about a cylindrical object or on a flat sheet or on an irregularly shaped object.

Another feature of the present invention is in the method of tilting the torch. In welding two flat plates together along their abutting edges, the torch is usually held perpendicular to the sheets. In the welding of a boss onto a flat plate, however, it is necessary to tilt the torch at an angle that is roughly one-half the angle between the longitudinal axis of the boss and the plate. In prior machines, the torch was tilted about a point along the axis of the torch, but at some distance from the working end of the torch. This made it necessary, after the torch was tilted, to re-position the torch so that its working end was positioned to the desired weld line. In the present invention, the tilt is accomplished by rotating the torch assembly about a point which is essentially on the line of weld. It is thus possible to continuously vary the angular position of the torch with respect to one of the workpieces for cases where the angle between the two parts being welded varies from point to point along the line of weld. These new modes of operation increase the utility of the welding process and open a great field of new applications for which the process may be utilized.

It is the object of this invention to allow for the provision of a gas tungsten arc welding machine in which the welding torch may be rotated continuously about a cylindrical object or within a cylindrical shell for an infinite number of revolutions.

Another object is to provide means for carrying the necessary gases and cooling water for the torch from stationary positions on the machine to the rotating torch.

Another object is to provide means for carrying current from a welding power supply to a moving torch.

Another object is to provide means for tilting the torch about a point at which piece parts to be welded are being welded.

Another object is to provide means for tilting the torch at the same time the torch is being rotated about a cylindrical object.

Another object is to provide means for maintaining the arc voltage at a desired level during the welding operation.

Another ancillary object is to provide means for welding inside a relatively small diameter tube.

Figure 1:
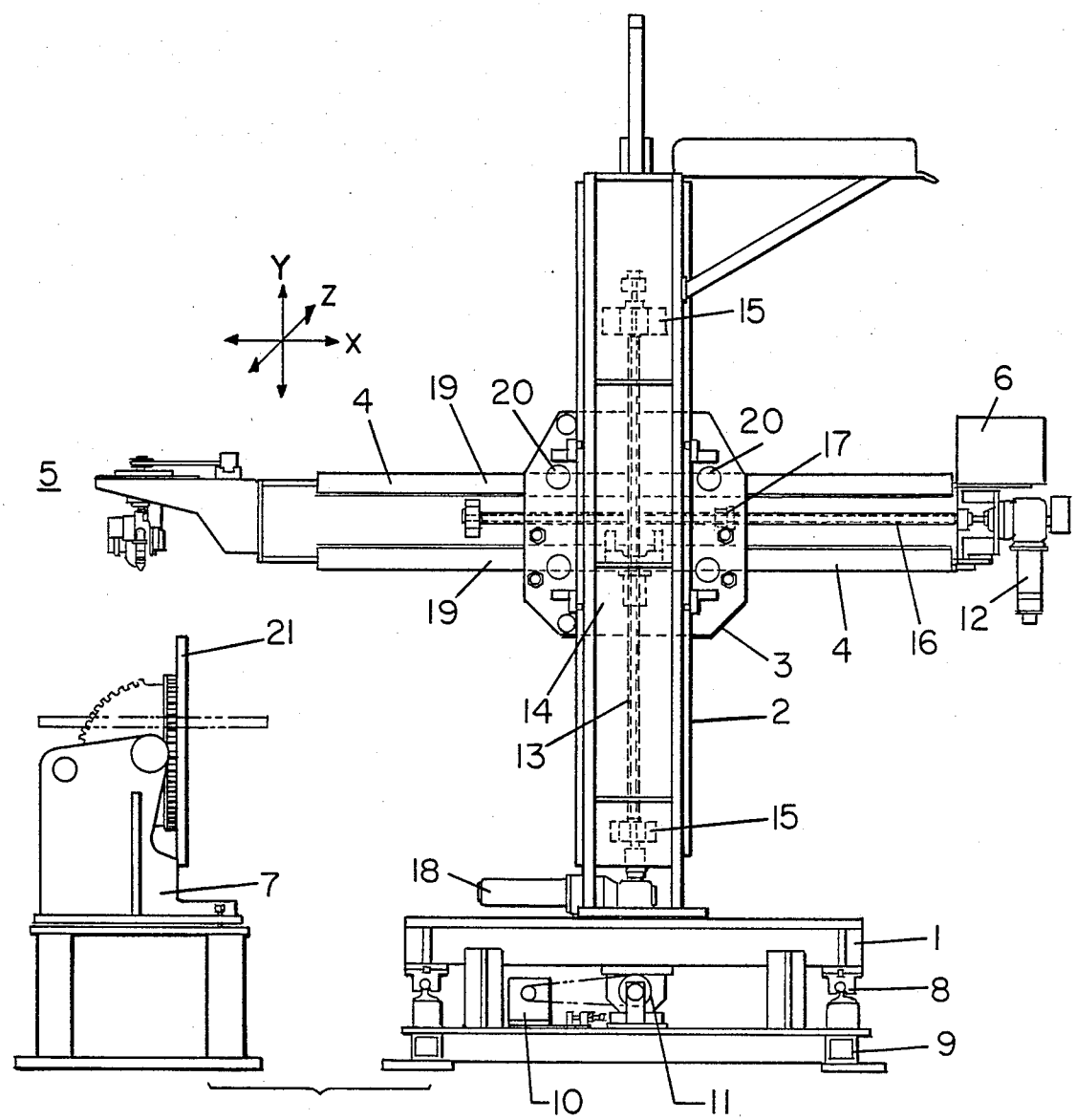
FIG. 1 is a front view of the gas tungsten arc welding machine.

FIG. 1 is an illustration of a complete welding apparatus embodying the invention. The apparatus comprises a base positioning assembly [1] supported by precision slides [8] upon the base assembly [9] which is fixed to the factory floor. Motor [10] driving screw & ball nut assembly [11] moves the base positioning assembly along the slides [8]. A column assembly [2] is fixed to the base positioning assembly [1]. A saddle assembly [3] is fitted to the column assembly [2] and arranged so that it may be moved vertically up and down the column assembly through the action of gear motor [18] and screw and ball nut arrangement [13] and [14], the screw being supported at both ends by bearings [15], with the ball nut [14] fixed to the saddle assembly [3]. The ram assembly [4] carrying tracks [19] is supported by rollers

[20] fixed to the saddle assembly [3] which allows the ram assembly to move along the X-axis powered by gear motor [12] which drives the ram assembly by means of the screw [16] and ball nut [17] mounted on the saddle assembly. The welding torch manipulator [5], along with its accessory equipment for rotating and tilting the torch, the wire feed apparatus and current transfer apparatus, is mounted at one end of the ram, and the arc starting apparatus [6] and X-axis drive for the ram [12] are mounted at the other end. A tilt weld positioner [7] for supporting, tilting and rotating the part to be welded is fixed to the factory floor, centered over the welding torch. The positioner [7] is provided with a rotatable faceplate [21] which is also tiltable through an arc of approximately 100 degrees. Parts to be welded are fastened to the faceplate [21], whose motion may be programmed for rotation or tilt to conform to the welding requirements of the particular piece part.

Figure 2:
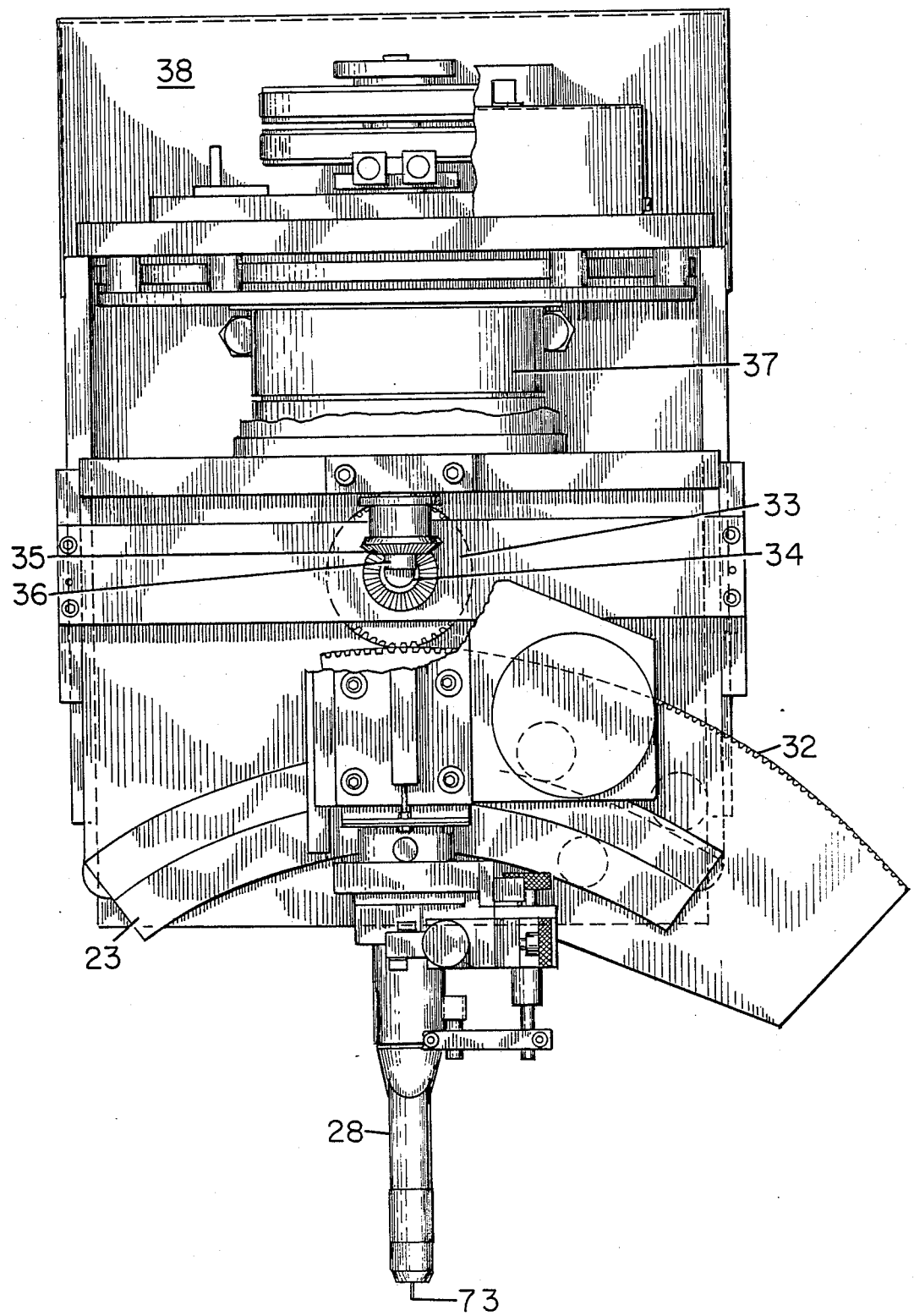
FIG. 2 is a front view of the torch manipulator assembly.
Figure 4:
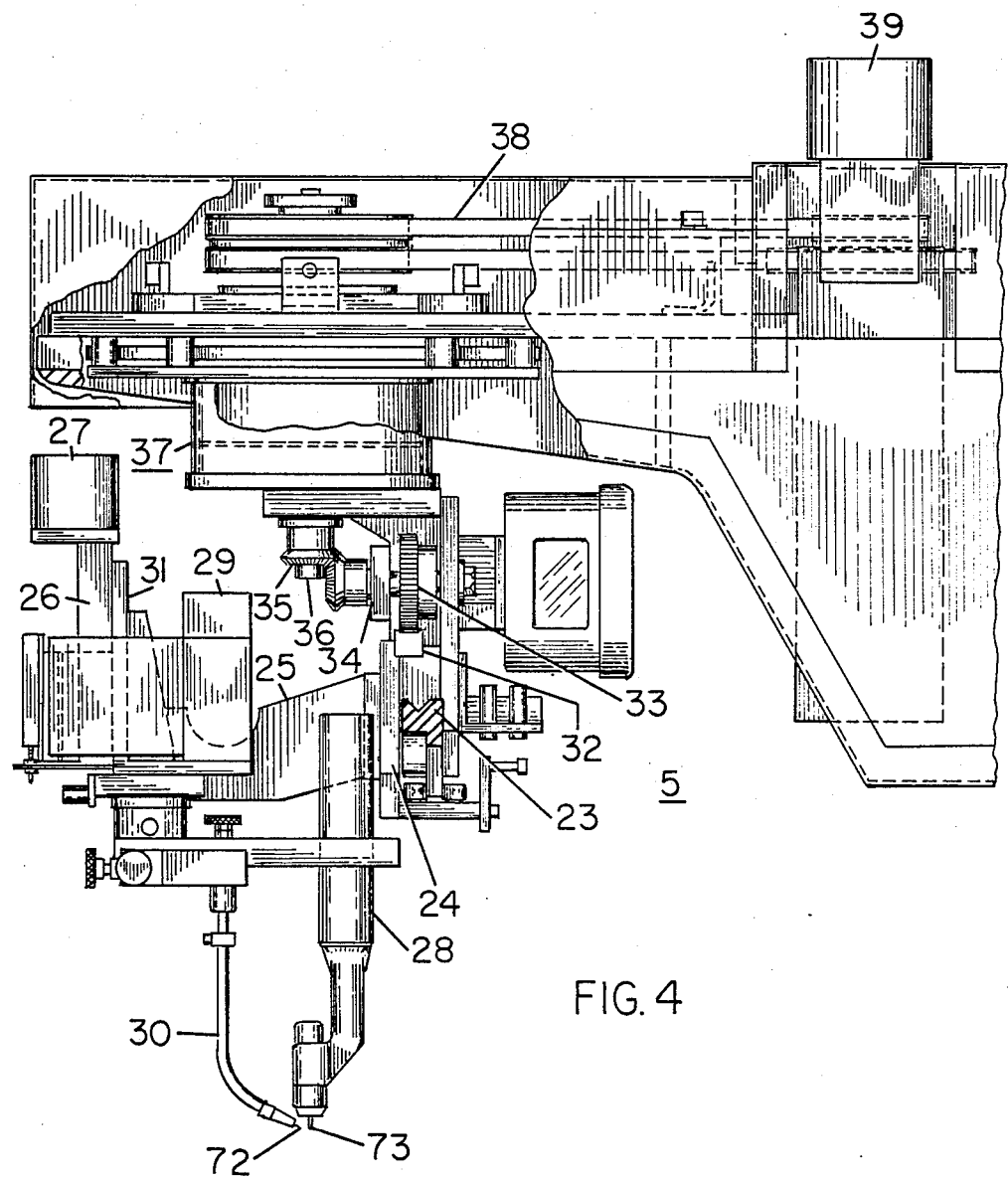
FIG. 4 is a detail of the arc voltage control mechanism and a side view of the torch tilt mechanism.
Figure 5:
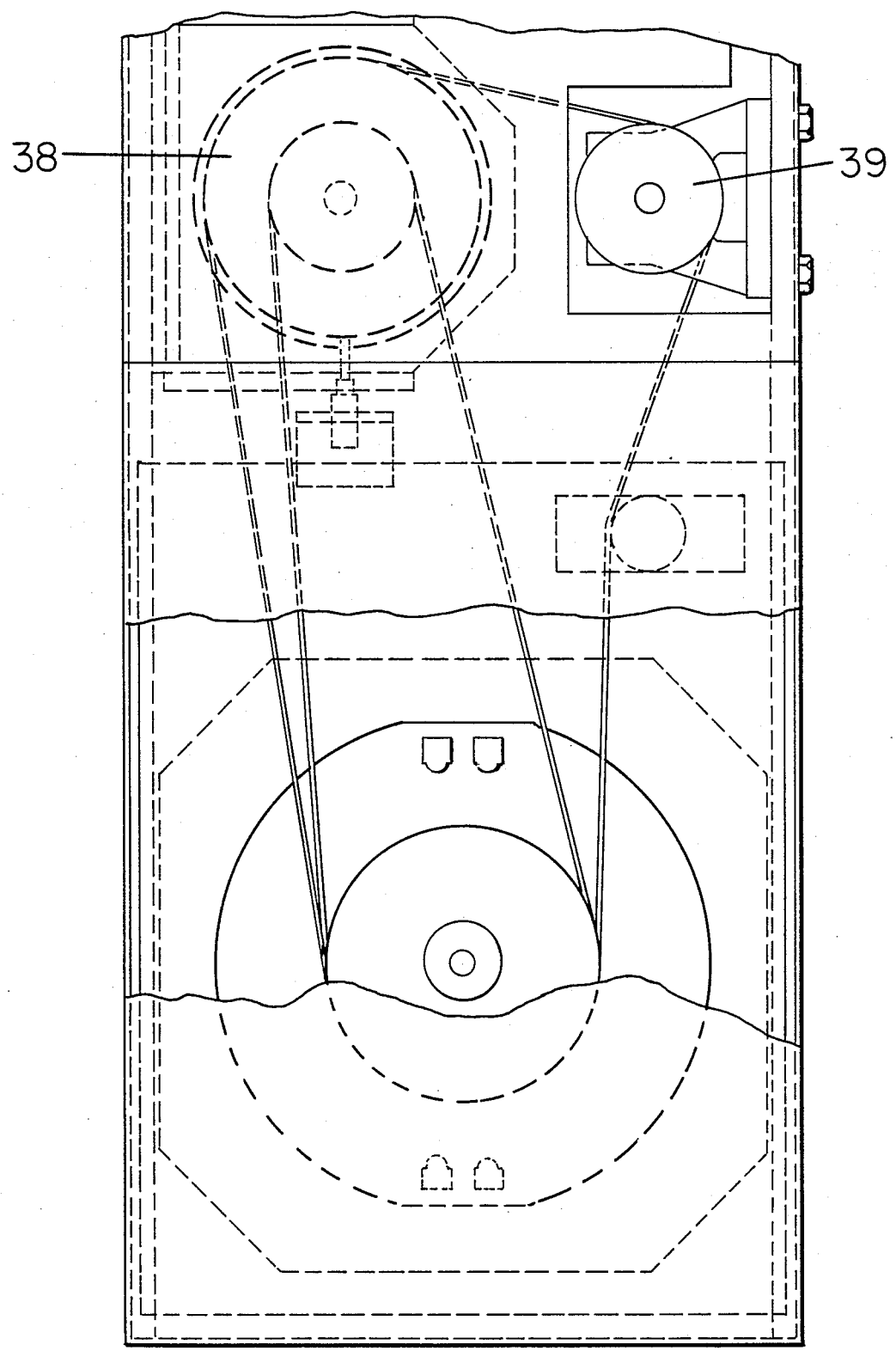
FIG. 5 is a top view of the torch-tilt drive system.
Figure 6A:
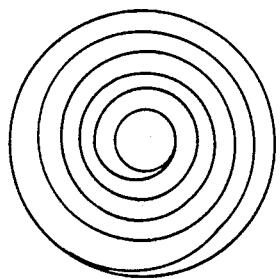
FIG. 6 illustrates the welding of a spiral line on a cylindrical workpiece.
Figure 6:
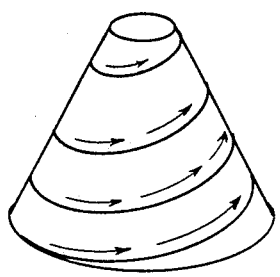

The torch manipulator [5] is illustrated in FIG. 2 and FIG. 4. The torch manipulator is provided with means for rotating the torch continuously along with the wire feed spool and wire guides, and includes means for moving the torch along its longitudinal axis in order to maintain a preset arc voltage between the torch and the work and also means for continuous rotation of the torch and accessories, which includes means for providing the necessary gases and cooling medium and welding current from stationary members to the rotating torch. Means are also provided on the torch manipulator assembly [5] for tilting the torch [28] and its accessory components about the torch tip [73]. The apparatus for tilting the torch comprises a track [23] and carriage [24] riding on the track, formed into an arc whose center is the tip of the torch. The track guides the torch assembly when it is tilted and maintains its position at any point along the arc. Mounted on the carriage [24] is an arm [25] which carries apparatus for moving the torch along its longitudinal axis over a distance of approximately one-half inch in order to maintain the arc voltage at a preset level. A slide [26] carrying the automatic voltage control motor [27], which corrects the position of the welding torch to maintain a fixed voltage, carries the torch [28] and wire feed drive and wire straightener [29] and wire guide [30]. The slide [26] moves along associated member [31] which is fixed to arm [25] which, in turn, is supported by the carriage plate [24] which is guided and supported by the track [23]. The carriage with rack [32] is driven by a spur gear [33] which is mounted on a shaft [34] which is driven by mitre gears [35]—the driving gear being mounted on a hollow shaft [36] which extends through a rotating union [37] which carries the necessary gases and water for cooling the torch from stationary positions through the rotating member to the torch. The shaft is driven, by a belt and pulley arrangement [38], by a positioning motor [39].

Figure 3:
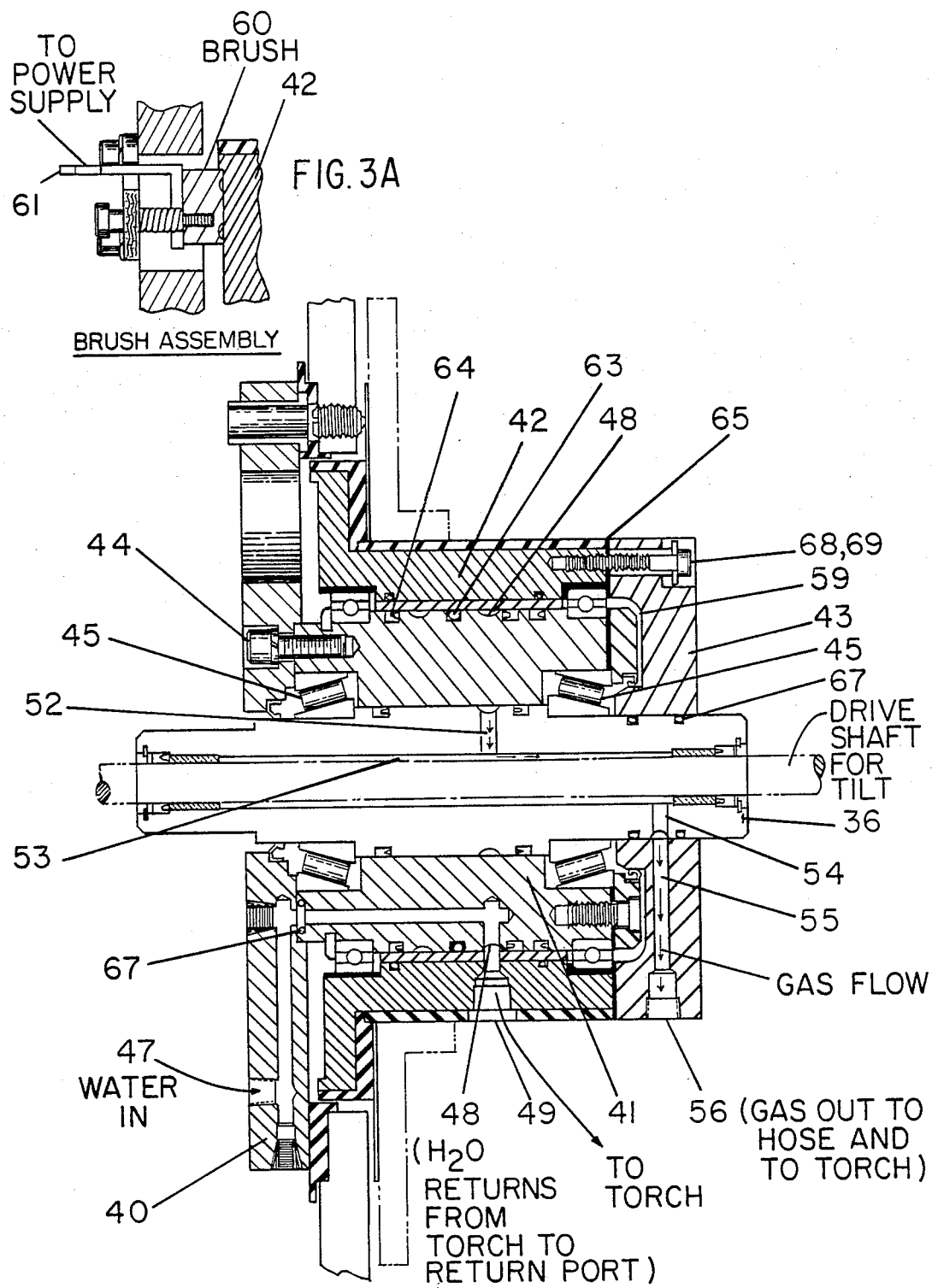
FIG. 3 is a detail drawing of the rotating joint which carries the gases and the cooling fluids from a stationary position to the rotating torch.

The rotating union (or joint) [37], which carries the gases and the cooling fluids and electric welding current from a stationary position to the rotating torch, is illustrated in FIG. 3. The rotating joint comprises a stationary manifold base [40], a stationary manifold cylinder [41], a rotating contact ring [42] and an end cap [43]. The two manifolds [40] and [41] are fixed to one another by bolts [44], and the hollow shaft [36], end plate [43] and contact ring [42] are fastened one to another. The hollow shaft is supported by a set of bearings [45] at the ends of the inner wall of the manifold cylinder [41] to allow for rotation of the hollow shaft [36], end plate [43] and conductor ring [42] with respect to the manifolds [40] and [41]. The several parts of the joint are drilled in such a way as to provide paths for water to flow to and from the welding torch through the rotating union. Water flows from the supply through a water inlet [47] on the stationary manifold through a passageway drilled in the manifolds [40] and [41], through a channel [48] machined in the cylindrical manifold [41], and out through the water outlet port [49], which is fitted with a hose which carries the water to the torch. The water returns from the torch through a second hose, through a second fitting, through a second channel and passageway in the manifolds and out through a water outlet port on the stationary manifold [40].

Two separate gases may be fed from a stationary position to the torch through a second set of holes drilled in the manifolds. Gas No. 1 may enter through a port in the stationary plate manifold [40] and flow through a mating passage in the manifold cylinder and through a hole [52] in the hollow shaft, flow in the space [53] between the inside of the hollow shaft and the central shaft and out through a hole [54] drilled through the hollow shaft, through a hole [55] in the end plate and out through the gas No. 1 outlet port [56] to the torch. Gas No. 2 will flow from a second inlet port through holes in the manifold pate and manifold cylinder and exit from the end plate through a hole in the end plate which connects to a space [59] in the end plate and the manifold cylinder. "O"-ring seals [63] and compression rings [64] are arranged between parts that rotate with respect to one another so as to separate the channels carrying water or gas to prevent the mixing of one gas with another or with water. "O"-ring seals [67] and gaskets [65] are used to seal surfaces which remain fixed one to another. Insulating washers [68] and bushings [69] are used to prevent arcing between the current carrying ring manifold [42] and ground.

Figure 7:
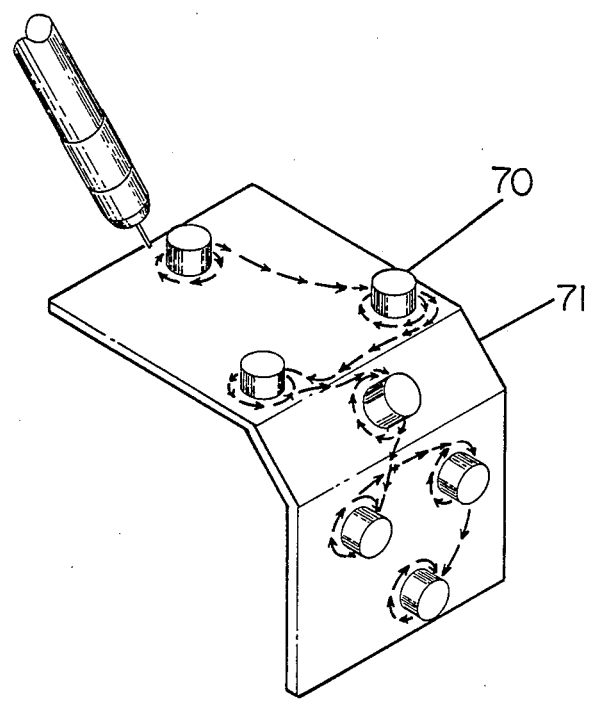
FIG. 7 illustrates the welding of a multiplicity of bosses onto an irregularly shaped part.
Figure 8:
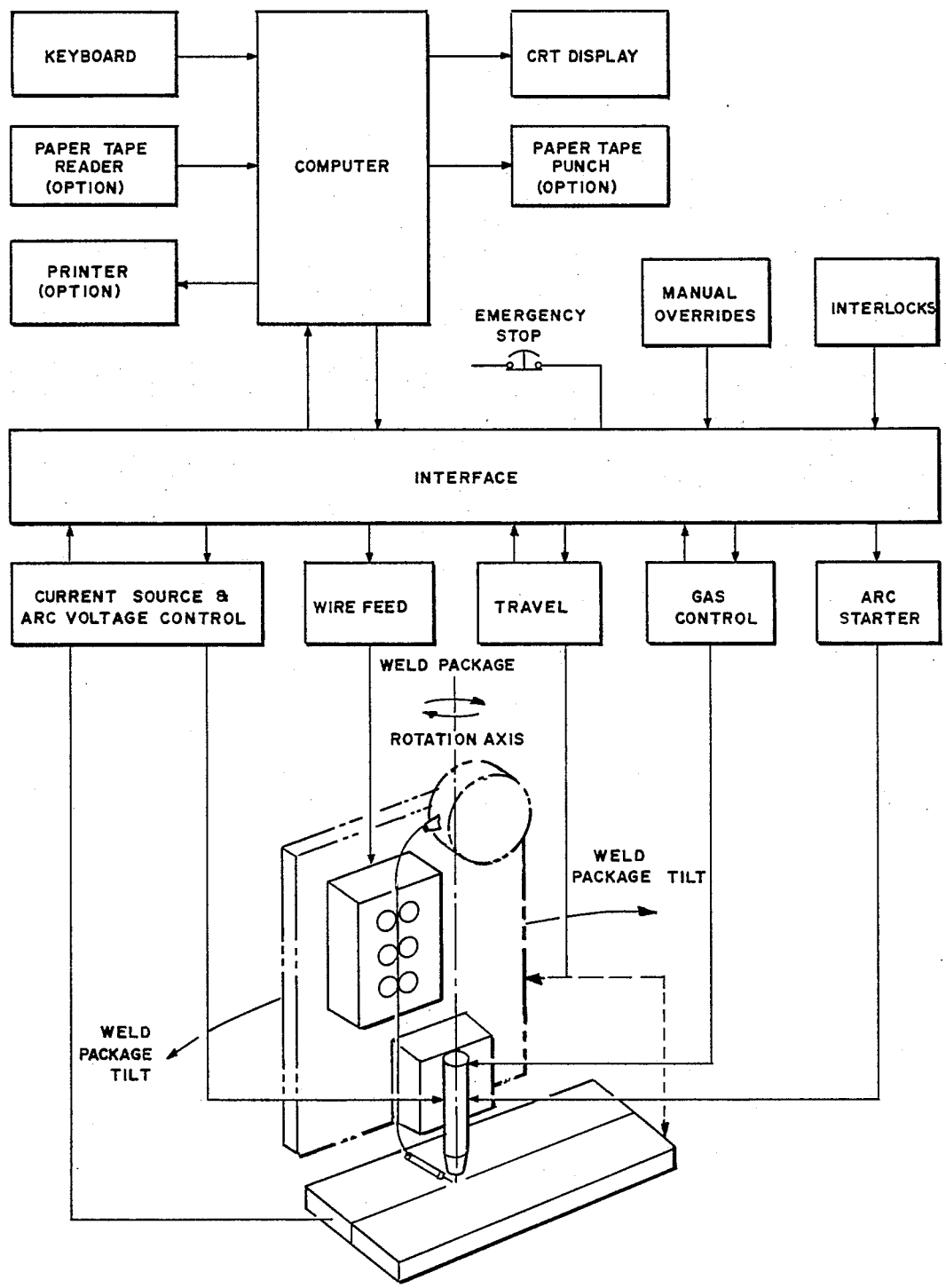
FIG. 8 is a block diagram showing the various control elements applied to a machine shown in schematic form.

The electric current for the arc is carried from the power supply by cables through a graphite brush [60] and holder [61] which transfers the current from the graphite brush [60] to the brass contact ring [42]. The water fitting [49] also carries the arc current to the torch through a conductor which is held on the inside of the hose carrying water to the torch for cooling. Through this device the welding torch assembly, comprising the welding torch, the tilting arrangement, wire feed, the wire guide and the automatic voltage control, may be rotated continuously by means of the hollow shafts while the water is being passed from the torch and the necessary gasses and current supplied to the weld area. Through the use of the apparatus of this invention, the utility of the welding method is greatly enhanced and welding jobs which heretofore have been deemed impossible or too time-consuming may be accomplished expeditiously. In welding applications utilizing the older type of equipment, the welding torch and the services are mounted and connected through draped hoses and cables which wind around the torch when it is rotated. Welding, therefore, must be periodically interrupted for the task of unwinding the cables. The new method and apparatus have overcome the inconvenience and the impracticality of many welding applications and, thus, increased the usefulness of arc welding equipment and the arc welding process in general. An illustration of the greater utility of this method and apparatus is shown in FIG. 7. There are many applications where it is necessary to weld a number of circular or rectangular bosses [70] onto a flat or cylindrical surface [71]. For this application, the work is stationary and the torch must be rotated slightly more than 360 degrees to weld completely around the boss. With the older equipment, if a series of bosses is to be welded, it is necessary to make a first weld allowing the hoses to wind around the machine. After welding one boss, the torch must be returned to the starting position to unwind the hoses by reversing the torch rotation, and the torch then moved to the next boss to be welded. With the machine of the present invention, this is unnecessary since the hoses do not wind around the torch. The torch may be rotated continuously. In welding bosses, therefore, the first boss is welded and, after completion, the torch is moved to the second boss and continued in rotation in the same direction and to the third and fourth, etc.

Another important feature of the invention is that of supporting the wire feed guides [30] on the tilt apparatus. By this means, wire is fed to the weld area to a desired position with respect to the torch which will produce the optimum welding result. Since the wire guide [30] maintains its position relative to the torch when the torch is rotated or tilted, the filler wire will be fed to the desired position on the workpiece at all times. This feature becomes most important when welding along irregular paths on surfaces that are not flat. If the wire is first set to be fed so that it is at 45 degrees to the work and the torch, this relationship will be maintained throughout the welding operation.

When welding with the old equipment in which the torch was tiled by rotating the torch about a point other than the torch tip, it is necessary to readjust the torch position after each tilt is effected in order to reposition the torch tip to the desired weld line. With the tilt method of the present invention, repositioning is not necessary since the tip always remains at the weld line and point.

While one embodiment of the invention has been shown and described, it will be understood that this is illustrative only and is not to be taken as a definition of the scope of the invention, which may be realized from the following claims:

What is claimed is:

1. An automatic machine for practicing the gas tungsten arc welding process comprising:
   a welding torch;
   means for supporting the said welding torch;
   means for rotating the welding torch about its longitudinal axis an infinite number of degrees;
   means for tilting the said welding torch about its welding tip over a predetermined angle;
   means, associated with said means for tilting the said weld torch, for guiding the said welding torch along an arcuate path;
   means for supplying the said torch with a cooling medium and one or more gases; and
   means for simultaneously rotating and tilting the said welding torch, a wire feed and straightening mechanism and conduits for supplying a cooling medium to the welding torch and arc shielding gases to the welding torch area.

2. An automatic machine for practicing the gas tungsten arc welding process as in claim 1 (Amended), including means for adjusting the position of the feed wire as it is fed to the weld area.

3. An automatic machine for practicing the gas tungsten arc welding process as in claim 1 (Amended), including means for supporting the said wire feed and wire straightening mechanism and a reel of wire on a torch support.

4. An automatic gas tungsten arc welding machine carrying a torch manipulator which is movable so as to weld along three mutually perpendicular axes, the said torch manipulator comprising:
   a support plate on said torch manipulator provided with an arcuate track;
   a carriage supported by and movable on said track;
   a means for supporting a welding torch on said carriage;
   means mounted on said carriage for feeding filler wire to a weld area and means for moving a filler wire guide and a welding torch along lines parallel to the said welding torch's longitudinal axis, mounted on said carriage;
   an arcuate rack mounted on said movable carriage;
   a spur gear mounted rotatably on a shaft supported on the aforementioned support plate and meshed with said rack;
   a set of miter gears arranged to drive the said spur gear; and
   a means for driving the said miter gears by a shaft passing through the center of a rotatable union, so as to cause the said carriage to tilt about an arc whose center is at the point of welding, the said rotatable union having a stationary part and a rotatable part to which the first-mentioned support plate is fixed; and a means for driving the said support plate and its attachments by a hollow shaft passing through the center of the union through which the first-mentioned shaft passes, so as to cause the said first-mentioned support plate and its attachments to rotate about the vertical axis of the rotatable union.

5. An automatic gas tungsten arc welding machine as in claim 4, including a rotatable union comprising:
   a stationary manifold cylinder [41] with an opening concentric with its longitudinal axis; a stationary manifold base [40], with an opening at its center, fastened to one end of said manifold cylinder;
   a rotatable contact ring surrounding the stationary manifold cylinder;
   a ring of insulating material sealingly held between the two cylinders;
   an end plate having an opening at its center sealingly fastened to the open end of the rotatable contact ring; and
   a hollow shaft, passing through said openings, and sealingly fixed to the end plate [43] and provided with separate passageways [52] and [54] from the center wall of the hollow shaft to separate circumferential channels about its outer surface which communicate with separate passageways in the stationary manifold cylinder [41] and separate passageways in the end plate [43], so as to allow the passage of several fluids and gases from separate ports on the stationary manifold plate to corresponding ports on the outer wall of the rotatable contact ring and end plate; and a second shaft rotatable within the said hollow shaft and fitted to said hollow shaft with sealed bearings.

6. An automatic gas tungsten arc welding machine as in claim 5, including means for passing elecric current from a terminal, insulated from and supported on the fixed manifold base, to a surface on the said rotatable contact ring.

7. An automatic gas tungsten arc welding machine as in claim 5, including conductive brush means for passing electric current from a terminal to a surface on said rotatable contact ring.

8. An automatic gas tungsten arc welding machine as in claim 5, including means for passing fluids through separate conduits to and from ports on the rotatable portion of the rotatable union to and from said welding torch.

9. An automatic gas tungsten arc welding machine including means for connecting said stationary manifold base of a rotatable union as in claim 5 to a source of fluids and gases and electric current.

* * * * *